United States Patent
Higuchi et al.

(10) Patent No.: US 12,122,310 B2
(45) Date of Patent: Oct. 22, 2024

(54) VEHICLE USER IDENTIFICATION

(71) Applicant: Toyota Motor Engineering & Manufacturing North America, Inc., Plano, TX (US)

(72) Inventors: Takamasa Higuchi, Mountain View, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 292 days.

(21) Appl. No.: 17/348,313

(22) Filed: Jun. 15, 2021

(65) Prior Publication Data
US 2022/0396227 A1 Dec. 15, 2022

(51) Int. Cl.
*B60R 16/037* (2006.01)
(52) U.S. Cl.
CPC .................. *B60R 16/037* (2013.01)
(58) Field of Classification Search
CPC .................................................. B60R 16/037
See application file for complete search history.

(56) References Cited

U.S. PATENT DOCUMENTS

| | | | |
|---|---|---|---|
| 9,545,931 B1* | 1/2017 | Canale | G06F 16/24 |
| 9,663,112 B2 | 3/2017 | Abou-Nasr et al. | |
| 9,794,729 B2 | 10/2017 | Meyers et al. | |
| 10,009,427 B2 | 6/2018 | Grover et al. | |
| 10,946,716 B2 | 3/2021 | Ireri | |
| 11,287,784 B1* | 3/2022 | Picardi | G07C 5/008 |
| 2016/0142877 A1 | 5/2016 | Gujral et al. | |
| 2018/0063277 A1* | 3/2018 | Lühr | H04W 4/48 |
| 2018/0208204 A1* | 7/2018 | Chen | G06F 1/1694 |
| 2018/0229674 A1* | 8/2018 | Heinrich | A61B 5/18 |
| 2020/0198581 A1* | 6/2020 | Ette | B60R 25/31 |
| 2021/0394766 A1* | 12/2021 | Crawford | H04K 3/45 |

OTHER PUBLICATIONS

Lara, O.D. et al., "A Survey on Human Activity Recognition using Wearable Sensors," IEEE Communications Surveys & Tutorials, vol. 15, No. 3, pp. 1192-1209 (2013).

* cited by examiner

*Primary Examiner* — Peter D Nolan
*Assistant Examiner* — Demetra R Smith-Stewart
(74) *Attorney, Agent, or Firm* — Christopher G. Darrow; Darrow Mustafa PC

(57) ABSTRACT

Systems, methods, and other embodiments described herein relate to identifying a user of a vehicle. In one embodiment, a method includes determining an activity of the user using one or more mobile devices. The method includes detecting an event in the vehicle using one or more vehicle sensors. The method includes identifying the user based on a relationship between the activity and the event.

20 Claims, 5 Drawing Sheets

VEHICLE USER IDENTIFICATION

TECHNICAL FIELD

The subject matter described herein relates, in general, to systems and methods for identifying a user of a vehicle.

BACKGROUND

Modern vehicles include one or more vehicle systems that can be manually adjusted by a user to suit the user's preferences. As an example, the position of one or more vehicle seats can be manually adjusted. As another example, the temperature of the vehicle cabin can be manually adjusted. Other vehicle systems such as an entertainment system and a navigation system can be set at the beginning of a trip by the user.

SUMMARY

In one embodiment, a system for identifying a user of a vehicle is disclosed. The system includes one or more mobile devices capable of determining an activity of the user. The system includes one or more vehicle sensors capable of detecting an event. The system includes one or more processors, and a memory in communication with the one or more processors. The memory stores a user identification module including instructions that when executed by the one or more processors cause the one or more processors to identify the user based on a relationship between the activity and the event.

In another embodiment, a method for identifying a user of a vehicle is disclosed. The method includes determining an activity of the user using one or more mobile devices and detecting an event in the vehicle using one or more vehicle sensors. The method also includes identifying the user based on a relationship between the activity and the event.

In another embodiment, a non-transitory computer-readable medium for identifying a user of a vehicle and including instructions that when executed by one or more processors cause the one or more processors to perform one or more functions is disclosed. The instructions include instructions to determine an activity of the user using one or more mobile devices, detect an event in the vehicle using one or more vehicle sensors, and identify the user based on a relationship between the activity and the event.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
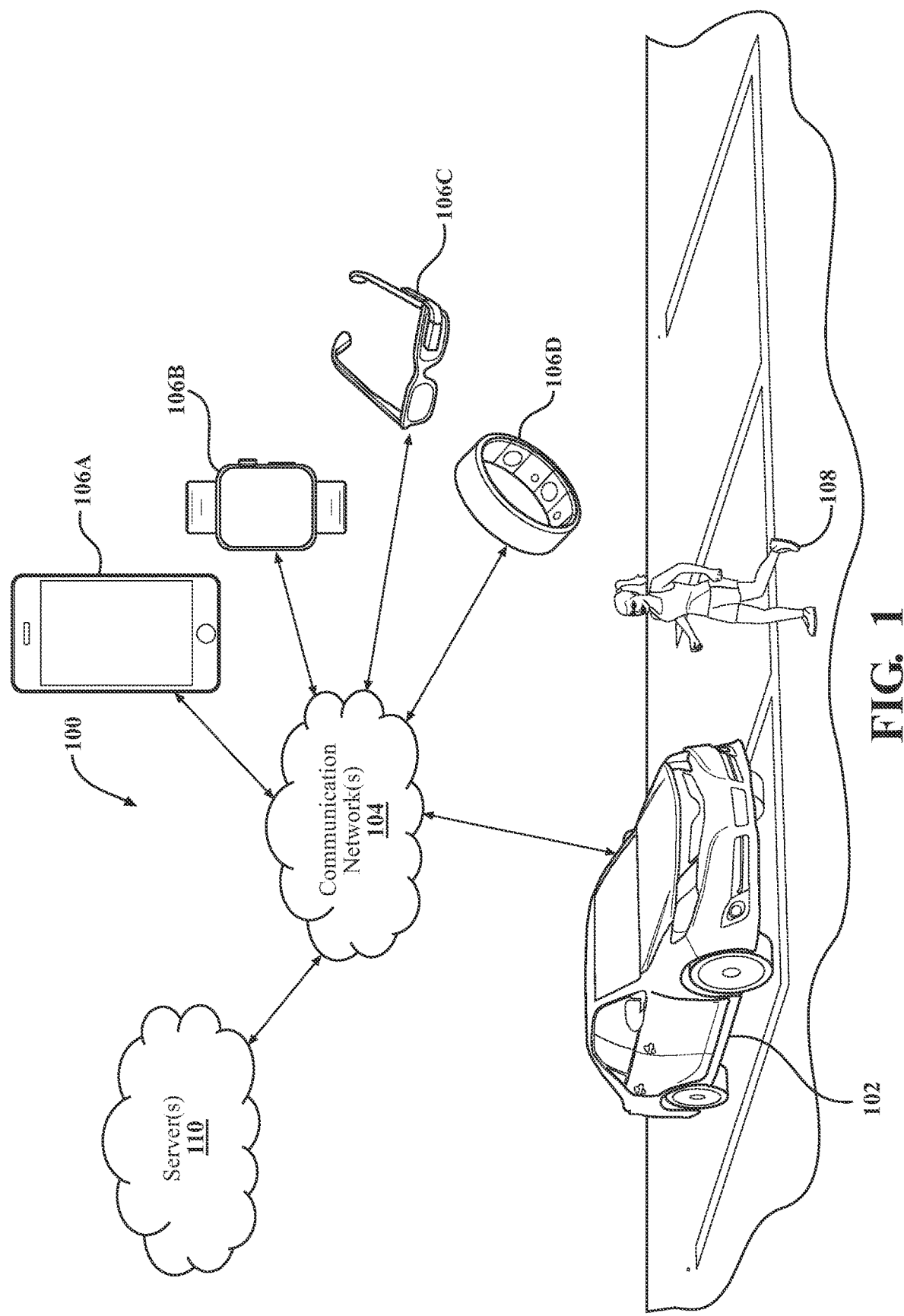
FIG. 1 is an example of a vehicle user identification system.

Systems, methods, and other embodiments associated with identifying a user of a vehicle are disclosed. A vehicle can include one or more vehicle systems that are customizable based on the user's preference. In a case where there are multiple users of a single vehicle, the settings of the vehicle systems such as the vehicle seats, the entertainment system, and the navigation system, can be adjusted to match the user(s) currently in the vehicle.

Currently, when one user with one set of vehicle system settings uses the vehicle after another user with another set of vehicle system settings, the one user would have to go through the settings menu for one or more vehicle systems to adjust the vehicle systems to match their preferences. Having to adjust the vehicle system settings can be time-consuming and can lead to errors.

Accordingly, in one embodiment, the disclosed approach is a system that identifies a user of a vehicle. Further, the system can customize one or more vehicle settings based on at least an identification of the user. The user can be a driver of the vehicle. Alternatively and additionally, the user can be a passenger of the vehicle.

To identify a user, the system can determine an activity of the user using one or more mobile devices. The mobile device(s) can be carried and/or worn by the user. The mobile device(s) can detect the activities of the user such as the user walking, moving their arms, standing, sitting, leaning forward. As an example, as the user approaches the vehicle, the mobile device(s) can transmit the activities of the user as well as the identity of the user to the system. The system can detect an event in the vehicle using one or more vehicle sensors such as door sensors, seat sensors, ignition sensors, engine sensors, cameras, and/or radar. The system can identify the user based on a relationship between the detected activities and the events. The relationship can be based on the time the activity occurred and the time the event occurred. The relationship can also be based on whether the activity could be the cause of the event. As an example, the activity may be the user sitting and the event may be a weight of 70 kg being placed on the front left seat. The system may determine that the identified user is in the driver's seat of the vehicle.

The system can store user profiles that include the user's preferred vehicle system settings. Upon identifying the user, the system can retrieve the identified user's profile and set the vehicle systems based on the user's preferences according to the user's profile.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a vehicle user identification system 100 is shown. The vehicle user identification system 100 may include various elements, which may be communicatively linked in any suitable form. As an example, the elements may be connected, as shown in FIG. 1. Some of the possible elements of the vehicle user identification system 100 are shown in FIG. 1 and will now be described. It will be understood that it is not necessary for the vehicle user identification system 100 to have all the elements shown in FIG. 1 or described herein. The vehicle user identification system 100 may have any combination of the various elements shown in FIG. 1. Further, the vehicle user identification system 100 may have additional elements to those shown in FIG. 1. In some arrangements, the vehicle user identification system 100 may not include one or more of the elements shown in FIG. 1. Further, it will be understood that one or more of these elements may be physically separated by large distances.

The elements of the vehicle user identification system 100 may be communicatively linked through one or more communication networks 104. As used herein, the term "communicatively linked" can include direct or indirect connections through a communication channel or pathway or another component or system. A "communication network" means one or more components designed to transmit and/or receive information from one source to another. The one or more of the elements of the vehicle user identification system 100 may include and/or execute suitable communication software, which enables the various elements to communicate with each other through the communication network and perform the functions disclosed herein.

The communication network(s) 104 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network 104 further can be implemented as or include one or more wireless networks, whether short-range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long-range (e.g., a mobile, cellular, and/or satellite-based wireless network; GSM, TDMA, CDMA, WCDMA networks or the like). The communication network 104 can include wired communication links and/or wireless communication links. The communication network 104 can include any combination of the above networks and/or other types of networks. The communication network(s) 104 can include one or more routers, switches, access points, wireless access points, and/or the like. In one or more arrangements, the communication network(s) 104 can include Vehicle-to-Infrastructure (V2I), or Vehicle-to-Everything (V2X) technology, which can allow for communications between the elements.

The vehicle user identification system 100 can include one or more vehicles 102. As used herein, "vehicle" means any form of motorized transport. In one or more implementations, the vehicle 102 can be an automobile. While arrangements will be described herein with respect to automobiles, it will be understood that embodiments are not limited to automobiles. In some implementations, the vehicle 102 may be any device that, for example, transports passengers and includes the noted sensory devices from which the disclosed predictions and determinations may be generated. The vehicle 102 can be any other type of vehicle that may be used on a roadway, such as a motorcycle. In some implementation, the vehicle 102 can be a watercraft, an aircraft, or any other form of motorized transport. The vehicle 102 is a connected vehicle that is communicatively linked to one or more elements of the vehicle user identification system 100.

The vehicle user identification system 100 can include one or more entities that may exchange information with the vehicle 102. The entities may include mobile devices such as a smartphone 106A, a smartwatch 106B, and other smart devices in the form of eyeglasses 106C and/or a ring 106D. The mobile device(s) (collectively known as 106) can be carried or worn by a user 108. The mobile device 106 can include one or more sensors such as an accelerometer, a magnetometer, a gyroscope, a barometer, a proximity sensor, and/or a global positioning system (GPS).

The mobile device 106 is capable of determining an activity of the user 108 using the one or more sensors. The activity can be standing, sitting, lying down, moving a limb, and changing position. As such and as an example, the mobile device(s) 106 can determine the position of the user when the user is standing, sitting, and/or lying down.

As an example of moving a limb, the mobile device(s) 106 can determine that the user is moving one leg or both legs, one or both feet, one or both arms, one or both hands as well as the direction of the movement, and the time that the movement occurred. As such and as an example, the mobile device(s) 106 can determine that the user is walking.

As an example of changing position, the mobile device(s) 106 can determine that the user 108 is changing from a standing position to a sitting position and/or a sitting position to a standing position. The mobile device(s) 106 can determine that the user 108 is leaning or bending forward and/or squatting. As previously mentioned, the mobile device(s) 106 can determine the activity using sensor data from one or more sensors. The mobile device(s) 106 can determine the activity using a fusion of the sensor data. Additionally and/or alternatively, the mobile device(s) 106 can determine the activity using any suitable machine learning mechanisms. The mobile device(s) 106 can also use historical information, user habit, user behavior, and/or user input. In the case of user input, the mobile device(s) 106 can request or verify an activity using input from the user.

The mobile device(s) 106 can include information identifying the user 108. The information can include a name, an identifying number, and/or any suitable information that can be used to identify the user 108.

The mobile device(s) 106 can communicate, by transmitting or broadcasting, the determined activity of the user 108, a timestamp of when the determined activity occurred, and/or information identifying the user 108 to any suitable entity such as a vehicle 102 and/or a server 110. As an example, the mobile device(s) 106 can transmit the determined activity, the timestamp and the identifying information to the vehicle 102, in response to a request from the vehicle 102. As another example, the mobile device(s) 106 can transmit the determined activity, the timestamp and the identifying information to the vehicle 102, when the mobile device(s) 106 determines that the mobile device(s) 106 is proximate to the vehicle 102. In such an example, the mobile device(s) 106 can determine that the mobile device(s) 106 is within a geo-fenced area related to the vehicle 102, and in response to determining that the mobile device(s) 106 is within the geo-fenced area, transmit the determined activity, the timestamp and the identifying information to the vehicle 102 and/or the server 110.

The vehicle user identification system 100 can include one or more servers 110. The server(s) 110 may be, for example, cloud-based server(s) or edge-based server(s). The server(s) 110 can communicate with the vehicle(s) 102 and/or the mobile device(s) 106 over the communication network(s) 104. The server(s) 110 can receive data from and send data to the vehicle(s) 102 and/or the mobile device(s) 106.

Figure 2:
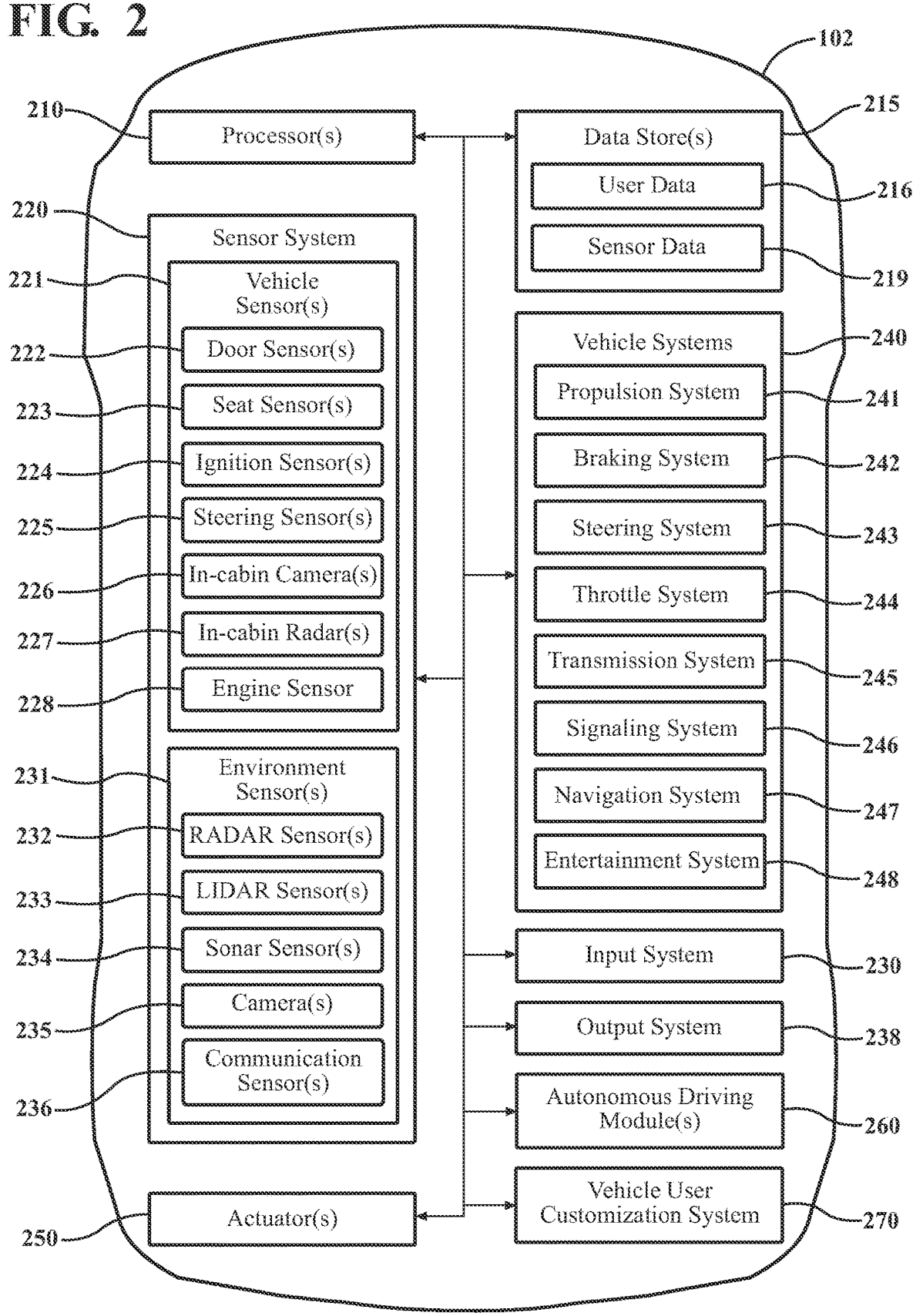
FIG. 2 illustrates a block diagram of a vehicle incorporating a vehicle user customization system.

Referring to FIG. 2, a block diagram of the vehicle 102 incorporating a vehicle user customization system 270 is illustrated. The vehicle 102 includes various elements. It will be understood that in various embodiments, it may not be necessary for the vehicle 102 to have all of the elements shown in FIG. 2. The vehicle 102 can have any combination of the various elements shown in FIG. 2. Further, the vehicle 102 can have additional elements to those shown in FIG. 2. In some arrangements, the vehicle 102 may be implemented without one or more of the elements shown in FIG. 2. While the various elements are shown as being located within the vehicle 102 in FIG. 2, it will be understood that one or more of these elements can be located external to the vehicle 102. Further, the elements shown may be physically separated by large distances. For example, one or more components of the disclosed system can be implemented within a vehicle while further components of the system are implemented within a cloud-computing environment. In such an example, the vehicle user customization system 270 may acquire data from the mobile device(s) 106 and vehicle 102 and execute as a cloud-based resource that is comprised of devices (e.g., distributed servers) remote from the vehicle 102 to identify a user 108 of a vehicle 102. It should be appreciated that apportionment of the processing between the vehicle 102 and the cloud server 110 may vary according to different implementations.

In one or more embodiments, the vehicle 102 can be a conventional vehicle that is configured to operate in only a manual mode. In one or more embodiments, the vehicle 102 can be an autonomous vehicle. As used herein, "autonomous vehicle" refers to a vehicle that operates in an autonomous mode. "Autonomous mode" refers to navigating and/or maneuvering the vehicle 102 along a travel route using one or more computing systems to control the vehicle 102 with minimal or no input from a human driver. In one or more embodiments, the vehicle 102 can be highly automated or completely automated. In one or more embodiments, the vehicle 102 can be configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 102 along a travel route.

The vehicle 102 can include one or more processors 210. In one or more arrangements, the processor(s) 210 can be a main processor of the vehicle 102. For instance, the processor(s) 210 can be an electronic control unit (ECU). The vehicle 102 can include one or more data stores 215 for storing one or more types of data. The data store 215 can include volatile and/or non-volatile memory. Examples of suitable data stores 215 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 215 can be a component of the processor(s) 210, or the data store 215 can be operatively connected to the processor(s) 210 for use thereby. The term "operatively connected," as used throughout this description, can include direct or indirect connections, including connections without direct physical contact.

In one or more arrangements, the one or more data stores 215 can include user data 216. The user data 216 can include a user profile for the user(s) of the vehicle. The user profile can identify a user of the vehicle and one or more vehicle settings associated with the user. The vehicle settings can be any configuration in the vehicle 102 that can be customized based on the user. The vehicle settings can be related to, as an example, seat settings such as temperature and positioning of the seat, temperature in the cabin and air conditioning settings, entertainment settings such as preferred music and/or video channels, driving style/preferences, navigation settings, and destination settings. The user profile may include multiple sets of vehicle settings for a single user based on conditions such as the time of day, the number of passengers in the vehicle, and/or the identity of other passengers in the vehicle. As an example of such a case, a user travelling alone may have an entertainment system set to talk radio while a user travelling with a second user may have an entertainment system set to music.

As an example and as previously mentioned, the user profile can identify the user using the name of the user, and/or any suitable identifier associated with the user such as a username or user number. The user data can include user profiles for multiple users of the vehicle. As an example, the user data can include five user profiles for a vehicle that is frequently used by five users. In such an example, the user profile associated with a user can include a username and the user's preferred seat position, temperature setting, air conditioning setting, music channels, video channels, driving style, navigation style and destination. The user data can be determined based on user input, whether the user is a driver or a passenger, historical information, and/or machine learning techniques.

In one or more arrangements, the data store(s) 215 can include sensor data 219. The sensor data 219 can originate from the sensor system 220 of the vehicle 102. The sensor data 219 can include data from and/or events detected by vehicle sensors 221, environment sensors 231, and/or any other suitable sensors in the vehicle 102. As an example, events that can be stored in the sensor data 219 are described below.

In some instances, at least a portion of the user data 216 and/or the sensor data 219 can be located in one or more data stores 215 located onboard the vehicle 102. Alternatively, or in addition, at least a portion of the user data 216 and/or the sensor data 219 can be located in one or more data stores 215 that are located remotely from the vehicle 102.

The vehicle 102 can include the sensor system 220. The sensor system 220 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 220 includes a plurality of sensors, the sensors can work independently from each other. Alternatively, two or more of the sensors can work in combination with each other. In such a case, the two or more sensors can form a sensor network. The sensor system 220 and/or the one or more sensors can be operatively connected to the processor(s) 210, the data store(s) 215, and/or another element of the vehicle 102 (including any of the elements shown in FIG. 2).

The sensor system 220 can include any suitable type of sensor. Various examples of different types of sensors will be described herein. However, it will be understood that the embodiments are not limited to the particular sensors described. The sensor system 220 can include one or more vehicle sensors 221. The vehicle sensor(s) 221 can detect, determine, and/or sense information about the vehicle 102 and/or an event inside the vehicle 102, such as in the vehicle cabin. The vehicle sensor(s) 221 can detect and/or record the time an event occurred. In one or more arrangements, the vehicle sensor(s) 221 can be configured to detect and/or sense position, orientation, and movement of components of the vehicle 102, such as the position, orientation, and movement of a vehicle door and/or a vehicle seat. In one or more arrangements, the vehicle sensor(s) 221 can be configured to detect the insertion and/or the removal of a key from the ignition, an engine start and/or an engine stop, and/or motion in the vehicle 102. The vehicle sensor(s) 221 may detect general information such as a weight has been placed on a vehicle seat or more precise information such as a weight of 80 kg has been placed on the front right seat.

The vehicle sensor(s) 221 can include one or more door sensor (s) 222 that can detect whether the vehicle door is, as an example, locked or unlocked, in an open position or a closed position, moving from the open position to closed position or moving from the closed position to the open position. The door sensor(s) 222 can detect whether the door is slightly open, fully open, or at a position in between. The door sensor(s) 222 can detect when a control interface such as a window control that is located on the vehicle door is being touched.

The vehicle sensor(s) 221 can include one or more seat sensors 223 that can detect that a weight has been placed on a vehicle seat and/or there is no weight on the vehicle seat. The seat sensor(s) 223 can detect the position of the vehicle seat such as the position of the base of the vehicle seat relative to the floor of the vehicle cabin and/or an angle between the back of the vehicle seat and the base of the vehicle seat. The seat sensor(s) 223 can detect that base of the vehicle seat is moving forwards, backwards and/or sideways. The seat sensor(s) 223 can detect that the back of the seat is moving forwards or backwards relative to the base of the vehicle seat, and as such, the angle between the base of the vehicle seat and the back of the vehicle seat is changing.

In a vehicle that includes a plurality of vehicle seats, the seat sensor(s) 223 can distinguish between the vehicle seats. In one or more arrangements, a single seat sensor 223 can be used to detect information on the plurality of vehicle seats. In one or more arrangements, a plurality of seat sensors 223 can be used to detect information on the plurality of vehicle seats. In such a case and as an example, a single seat sensor 223 can be configured to detect information for a single vehicle seat.

The vehicle sensor(s) 221 can include one or more radar sensors 227. The radar sensor(s) 227 can be located in the vehicle cabin and can detect the position and/or the movement of user(s) inside the vehicle cabin. The vehicle sensor(s) 221 can include one or more cameras 226. The camera(s) 226 can capture the position and/or the movement of the user(s) inside the vehicle cabin.

The vehicle sensor(s) 221 can include one or more ignition sensors 224. The ignition sensor(s) 224 can detect that a key is being inserted into and/or removed from the ignition. The ignition sensor(s) 224 can detect that there is a key in the ignition and/or there is no key in the ignition. The ignition sensor(s) 224 can detect the position of the key in the ignition, whether the key is being or has been turned.

The vehicle sensor(s) 221 can include one or more engine sensors 228. The engine sensor(s) 228 can detect that the engine is on, off, being started, and/or being stopped (or turned off). The vehicle sensor(s) 221 can include any other suitable sensors for detecting events in and/or around the vehicle.

Alternatively, or in addition, the sensor system 220 can include one or more environment sensors 231 configured to acquire, and/or sense driving environment data. "Driving environment data" includes data or information about the external environment in which the vehicle is located or one or more portions thereof. For example, the one or more environment sensors 231 can be configured to detect, measure, quantify and/or sense other objects in the external environment of the vehicle 102, such as, for example, lane markers, signs, traffic lights, traffic signs, lane lines, crosswalks, curbs proximate the vehicle 102, off-road objects, electronic roadside devices, etc.

The environment sensors can include one or more radar sensors 232, one or more LIDAR sensors 233, one or more sonar sensors 234, one or more cameras 235, and/or one or more communication sensors 236. In one or more arrangements, the one or more cameras 235 can be high dynamic range (HDR) cameras or infrared (IR) cameras. The communication sensor(s) 236 such as radio frequency identification (RFID) and near-field communication (NFC) readers may communicate with electronic objects such as RFID and/or NFC tags in the environment using any suitable means of communication such as Wi-Fi, Bluetooth, vehicle-to-infrastructure (V2I) wireless communication, vehicle-to-everything (V2X) wireless communication, RFIC, and NFC.

The vehicle 102 can include an input system 230. An "input system" includes any device, component, system, element or arrangement or groups thereof that enable information/data to be entered into a machine. The input system 230 can receive an input from the user (e.g., a driver or a passenger). The vehicle 102 can include an output system 238. An "output system" includes any device, component, or arrangement or groups thereof that enable information/data to be presented to the user (e.g., a person, a vehicle passenger, etc.).

The vehicle 102 can include one or more vehicle systems 240. Various examples of the one or more vehicle systems 240 are shown in FIG. 2. However, the vehicle 102 can include more, fewer, or different vehicle systems. It should be appreciated that although particular vehicle systems are separately defined, each or any of the systems or portions thereof may be otherwise combined or segregated via hardware and/or software within the vehicle 102. The vehicle 102 can include a propulsion system 241, a braking system 242, a steering system 243, throttle system 244, a transmission system 245, a signaling system 246, a navigation system 247, and/or an entertainment system 248. Each of these systems can include one or more devices, components, and/or a combination thereof, now known or later developed.

The navigation system 247 can include one or more devices, applications, and/or combinations thereof, now known or later developed, configured to determine the geographic location of the vehicle 102 and/or to determine a travel route for the vehicle 102. The navigation system 247 can include one or more mapping applications to determine a travel route for the vehicle 102. The navigation system 247 can include a global positioning system, a local positioning system or a geolocation system.

The entertainment system 248 can include one or more devices, applications, and/or combinations thereof, now known or later developed, configured to provide entertainment to the user(s). The entertainment system 248 can include an audio system, a video system, a gaming system, and/or a virtual reality system.

The processor(s) 210, the vehicle user customization system 270, and/or the autonomous driving module(s) 260 can be operatively connected to communicate with the various vehicle systems 240 and/or individual components thereof. For example, returning to FIG. 2, the processor(s) 210 and/or the autonomous driving module(s) 260 can be in communication to send and/or receive information from the various vehicle systems 240 to control the movement, speed, maneuvering, heading, direction, etc. of the vehicle 102. The processor(s) 210, the vehicle user customization system 270, and/or the autonomous driving module(s) 260 may control some or all of these vehicle systems 240 and, thus, may be partially or fully autonomous.

The processor(s) 210 and/or the vehicle user customization system 270 may be operable to control the vehicle seat, the entertainment system 248, the navigation system 247, the air conditioning system, the autonomous driving settings, and/or any other systems with adjustable settings such as mirror position settings, steering wheel position settings, control panel position settings, and/or foot pedal position settings. As an example, the processor(s) 210 and/or the vehicle user customization system 270 may adjust the positioning and/or the temperature of the vehicle seat based on the user profile. As an example, the processor(s) 210 and/or the vehicle user customization system 270 may select between the audio system, the video system, the gaming system, the virtual reality system, and/or any other suitable entertainment system based on the user profile. As another example, the processor(s) 210 and/or the vehicle user customization system 270 may further select a channel, a show, and/or a game within the selected entertainment system based on the user profile. The processor(s) 210 and/or the vehicle user customization system 270 may select the viewing settings such as brightness and/or contrast, the audio settings such as volume and/or selection between monophonic sound and stereophonic sound, and/or gaming control settings based on the user profile.

As an example, the processor(s) 210 and/or the vehicle user customization system 270 may select a destination and/or a route to a destination in the navigation system based on the user profile. As an example, the processor(s) 210 and/or the vehicle user customization system 270 may select the temperature, the air pressure level, and/or the direction of the air vents in the air conditioning system based on the user profile.

As an example, the processor(s) 210 and/or the vehicle user customization system 270 may select between a manual driving setting, a semi-autonomous driving setting, and a fully autonomous driving setting based on the user profile. Other systems, previously mentioned, such as positioning systems for mirror(s), steering wheel, control panel(s), and/or foot pedal(s).

The processor(s) 210 and/or the vehicle user customization system 270 can cause the vehicle system(s) to adjust its setting to the selected setting. As used herein, "cause" or "causing" means to make, force, compel, direct, command, instruct, and/or enable an event or action to occur or at least be in a state where such event or action may occur, either in a direct or indirect manner.

The vehicle 102 can include one or more actuators 250. The actuators 250 can be any element or combination of elements operable to modify, adjust and/or alter one or more of the vehicle systems 240 or components thereof to responsive to receiving signals or other inputs from the processor(s) 210, the vehicle user customization system 270, and/or the autonomous driving module(s) 260. Any suitable actuator can be used. For instance, the one or more actuators 250 can include motors, pneumatic actuators, hydraulic pistons, relays, solenoids, and/or piezoelectric actuators, just to name a few possibilities.

The vehicle 102 can include one or more modules, at least some of which are described herein. The modules can be implemented as computer-readable program code that, when executed by a processor 210, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively, or in addition, one or more data store 215 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 102 can include one or more autonomous driving modules 260. The autonomous driving module(s) 260 either independently or in combination with the vehicle user customization system 270 can be configured to determine travel path(s), current autonomous driving maneuvers for the vehicle 102, future autonomous driving maneuvers and/or modifications to current autonomous driving maneuvers based on data acquired by the sensor system 220, driving scene models, and/or data from any other suitable source such as determinations from the sensor data 219. "Driving maneuver" means one or more actions that affect the movement of a vehicle. Examples of driving maneuvers include: accelerating, decelerating, braking, turning, moving in a lateral direction of the vehicle 102, changing travel lanes, merging into a travel lane, and/or reversing, just to name a few possibilities. The autonomous driving module(s) 260 can be configured to implement determined driving maneuvers. The autonomous driving module(s) 260 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 260 can be configured to execute various vehicle functions and/or to transmit data to, receive data from, interact with, and/or control the vehicle 102 or one or more systems thereof (e.g., one or more of vehicle systems 240).

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 2, the vehicle 102 includes a vehicle user customization system 270 that is implemented to perform methods and other functions as disclosed herein relating to identifying a user of a vehicle. As will be discussed in greater detail subsequently, the vehicle user customization system 270, in various embodiments, may be implemented partially within the vehicle 102 and may further exchange communications with additional aspects of the vehicle user customization system 270 that are remote from the vehicle 102 in support of the disclosed functions. Thus, while FIG. 3 generally illustrates the vehicle user customization system 270 as being self-contained, in various embodiments, the vehicle user customization system 270 may be implemented within multiple separate devices some of which may be remote from the vehicle 102.

Figure 3:
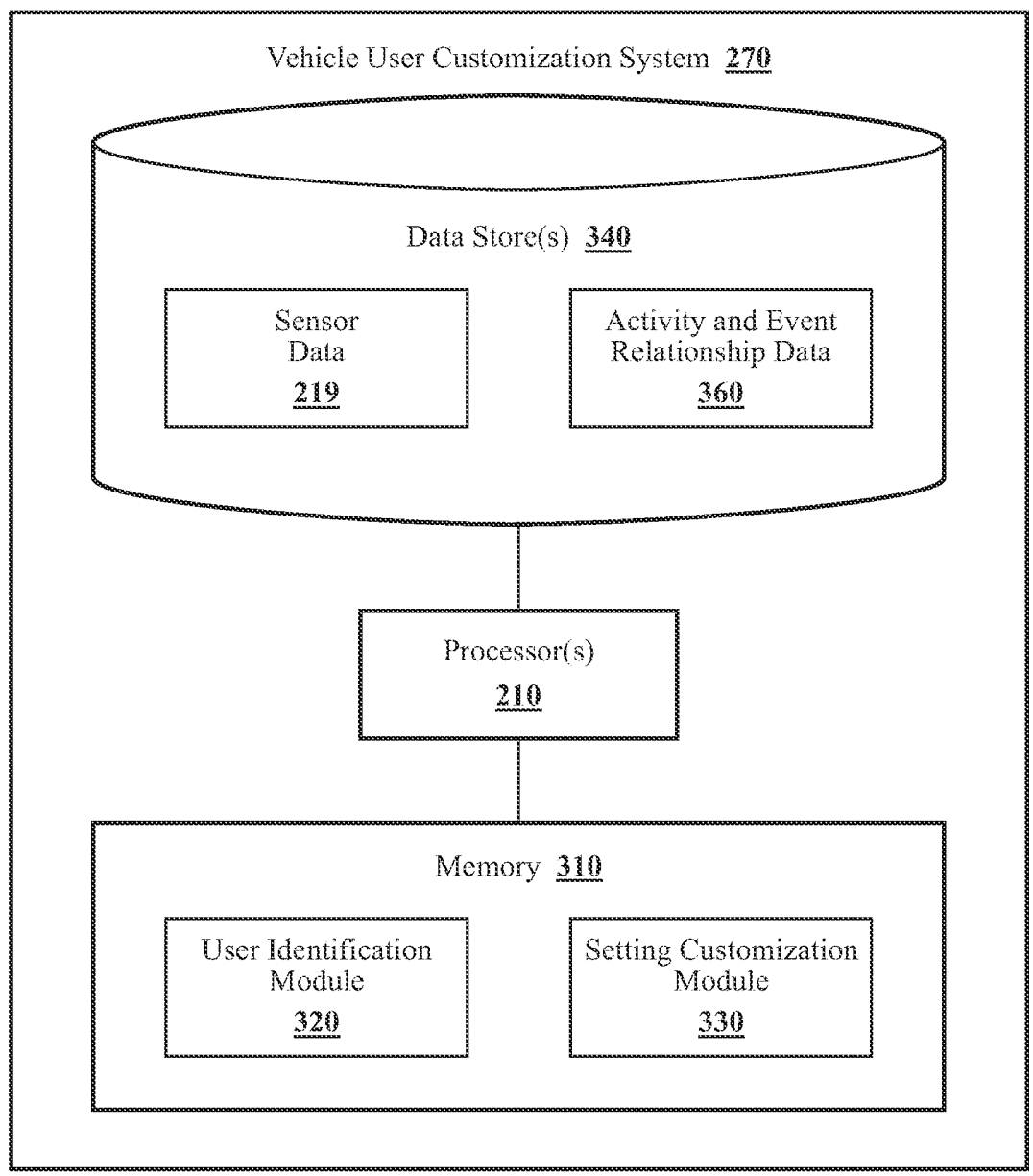
FIG. 3 illustrates one embodiment of the vehicle user customization system of FIG. 2.

With reference to FIG. 3, one embodiment of the vehicle user customization system 270 of FIG. 2 is further illustrated. The vehicle user customization system 270 is shown as including a processor 210 from the vehicle 102 of FIG. 2. Accordingly, the processor 210 may be a part of the vehicle user customization system 270, the vehicle user customization system 270 may include a separate processor from the processor 210 of the vehicle 102, and/or the vehicle user customization system 270 may access the processor 210 through a data bus or another communication path. In further aspects, the processor 210 is a cloud-based resource that communicates with the vehicle user customization system 270 through a communication network. In one embodiment, the vehicle user customization system 270 includes a memory 310 that stores a user identification module 320. In addition, the memory can store a setting customization module 330. The memory 310 is a random-access memory (RAM), read-only memory (ROM), a hard-disk drive, a flash memory, or other suitable memory for storing the modules 320 and 330. The modules 320 and 330 are, for example, computer-readable instructions within the physical memory 310 that when executed by the processor 210 cause the processor 210 to perform the various functions disclosed herein.

The vehicle user customization system 270 may include a data store(s) 340 for storing one or more types of data. Accordingly, the data store(s) 340 may be a part of the vehicle user customization system 270, or the vehicle user customization system 270 may access the data store(s) 340 through a data bus or another communication pathway. The data store(s) 340 is, in one embodiment, an electronically based data structure for storing information. In at least one approach, the data store 340 is a database that is stored in the memory 310 or another suitable medium, and that is configured with routines that can be executed by the processor(s) 210 for analyzing stored data, providing stored data, organizing stored data, and so on. In either case, in one embodiment, the data store(s) 340 stores data used by the modules 320 and 330 in executing various functions. In one embodiment, the data store(s) 340 may be able to store sensor data 219, activity and event relationship data 360, and/or other information that is used by the modules 320 and 330.

The data store(s) 340 may include volatile and/or non-volatile memory. Examples of suitable data stores 340 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 340 may be a component of the processor(s) 210, or the data store(s) 340 may be operatively connected to the processor(s) 210 for use thereby. The term "operatively connected" or "in communication with" as used throughout this description, can include direct or indirect connections, including connections without direct physical contact.

In one or more arrangements and as previously mentioned, the data store(s) 340 can include sensor data 219. The sensor data 219 can originate from the sensor system 220 of the vehicle 102. As an example, the sensor data 219 can include data from and/or event(s) detected by the door sensor(s) 222, the seat sensor(s) 223, ignition sensor(s) 224, steering sensor(s) 225, camera(s) 226, radar(s) 227, engine sensor(s) 228, and/or any other suitable sensors in the vehicle 102.

In one or more arrangements, the data store(s) 340 can include activity and event relationship data 360. The activity and event relationship data 360 can include one or more activities that can be determined by the mobile device(s) 106, one or more events that can be determined by the vehicle sensors 221, and a relationship between the activities and the events. The relationship can refer to whether the determined activity can cause the detected event. The activity and event relationship data 360 can store the activities, the events, and the relationship between the activities and the events in any suitable format such as in a table, as shown in Table 1 below.

TABLE 1

| Activity Determined by Mobile Device | Event Detected by Vehicle Sensor |
|---|---|
| Grabbing object in hand | Vehicle door handle touched |
| | Seat belt touched |
| | Key being inserted into ignition |
| | Key being removed from ignition |
| | Steering wheel touched |
| | Seat slid forward |
| | Seat slid backward |
| | Seat back folded downward |
| | Seat back moved upward |

TABLE 1-continued

| Activity Determined by Mobile Device | Event Detected by Vehicle Sensor |
| --- | --- |
| Moving arm in a swing motion, from right to left | Vehicle door (on a hinge) on driver's side opening |
| Moving arm in a pull motion, from left to right | Vehicle door (on a hinge) on driver's side closing |
| Moving arm in a swing motion, from left to right | Vehicle door (on a hinge) on passenger's side opening |
| Moving arm in a pull motion, from right to left | Vehicle door (on a hinge) on passenger's side closing |
| Moving arm in a sliding motion from left to right | Sliding vehicle door on driver's side opening<br>Sliding vehicle door on driver's side closing<br>Seat on passenger's side slid forward<br>Seat on driver's side slid backward |
| Moving arm in a sliding motion from right to left | Sliding vehicle door on passenger's side opening<br>Sliding vehicle door on passenger's side closing<br>Seat on driver's side slid forward<br>Seat on passenger's side slid backward |
| Moving arm downward | Seat back folded downward |
| Leaning forward and lifting leg | Motion in the vehicle cabin |
| Moving from a standing position to a sitting position | Weight being placed on a vehicle seat. |
| Moving from a sitting position to a standing position | Weight being lifted off a vehicle seat |
| Sliding in sitting position from right to left | Motion in the vehicle cabin<br>Weight being lifted off a right vehicle seat<br>Weight being placed on a left vehicle seat |
| Sliding in sitting position from left to right | Motion in the vehicle cabin<br>Weight being lifted off a left vehicle seat<br>Weight being placed on a right vehicle seat |
| Moving hand forward, and turning hand in a slight clockwise direction. | Key being inserted into the ignition<br>Engine starting |
| Moving hand backward | Key being removed from the ignition<br>Engine stopping |

As an example, an activity of a user 108 grabbing an object in their hand and moving their arm in a swing motion, from right to left may be related to an event of a vehicle door handle being touched and the vehicle door (on a hinge) opening. As an example, an activity of a user 108 grabbing an object with their hand and moving their arm in a pull motion, from left to right may be related to an event of a vehicle door handle being touched and the vehicle door (on a hinge) closing. As another example, an activity of the user 108 moving from a standing position to a sitting position may be related to an event of a weight being placed on a vehicle seat. As another example, an activity of the user 108 moving from a sitting position to a standing position may be related to an event of a weight being lifted from a vehicle seat.

As another example, an activity of the user 108 grabbing an object, moving their hand forward, and turning their hand in a slight clockwise direction may be related to the event of a key being inserted into the ignition and/or the engine starting. As another example, an activity of the user 108 grabbing an object in their hand, and moving their hand backward may be related to the event of a key being removed from the ignition and/or the engine stopping. As another example, an activity of the user 108 grabbing an object, leaning forward, lifting their leg, and sitting down may be related to an event of a seat back being folded downward, a motion in the vehicle cabin, and a weight being placed on a vehicle seat. As another example, an activity of the user 108 in sliding in a sitting position from right to left may be related to an event of a weight being lifted from a right vehicle back seat and being placed on a left vehicle back seat.

A single activity can have a relationship with a single event such as the activity of moving from a standing position to a sitting position can be related to weight being placed on a vehicle seat. Additionally and/or alternatively, a plurality of activities can have a relationship with a single event such as grabbing an object and moving arm downward can be related to seat back being folded downward. A single activity can have a relationship with a plurality of events such as grabbing an object can be related to vehicle door handle touched, seat belt touched, steering wheel, etc. A plurality of activities can have a relationship with a plurality of events such as grabbing an object and moving arm in a sliding motion from left to right can be related to sliding vehicle door on driver's side opening, sliding vehicle door on driver's side closing, seat on passenger's side sliding forward, seat on driver's side sliding backward, etc.

In one embodiment, the user identification module 320 includes instructions that function to control the processor 210 to identify the user 108 based on a relationship between the activity and the event. The relationship between the activity and the event can be based on a timestamp of the activity and a timestamp of the event. As an example, the relationship can be that the timestamp of the activity and the timestamp of the event are within a predetermined time period. As another example, the relationship can be that the timestamp of the activity is earlier than but within a predetermined time period of the timestamp of the event.

The user identification module 320 can receive user identification and activity information from the mobile device(s) 106, a timestamp for the activity, event information from the vehicle sensor(s) 221, and a timestamp for the event. In the case where the timestamp for the activity and the timestamp for the event are within the predetermined time period such as within 1 millisecond of each other, the user identification module 320 can determine whether the activity and the event have a relationship by comparing the activity and the event to the information in the activity and event relationship data 360.

In the case where the activity and the event have a relationship, the user identification module 320 can determine the user 108 based on the user identifying information received from the mobile device(s) 106. The more activities and events that the user identification module can determine have a relationship, the higher the confidence level in identifying the user. The user identification module 320 can further determine the seat position of the user 108, and/or whether the user 108 is a driver or a passenger based on the relationship between the user's activities and the event(s). In the case where there are multiple users identified and as an example, the user identification module 320 may apply additional precision to time, activity and/or event to further determine seating arrangements and which user 108 is driving.

In one embodiment, the setting customization module 330 includes instructions that function to control the processor 210 to customize one or more vehicle settings based on at least an identification of the user. The setting customization module 330 can receive information identifying the user such as user name and/or seat position from the user identification module 320 and can receive user data 216 from the data store(s) 215. The setting customization module 330 can determine the vehicle setting(s) for the user based on at least the identified user and/or the user data. The setting customization module 330 can further determine the vehicle settings(s) based on the time of travel, where the user is sitting, whether the user is a driver or a passenger, and/or whether the user is travelling alone or with others. The setting customization module 330 can output a control signal to the vehicle system(s) instructing the vehicle system(s) to adjust their settings based on the determined vehicle settings.

Figure 4:
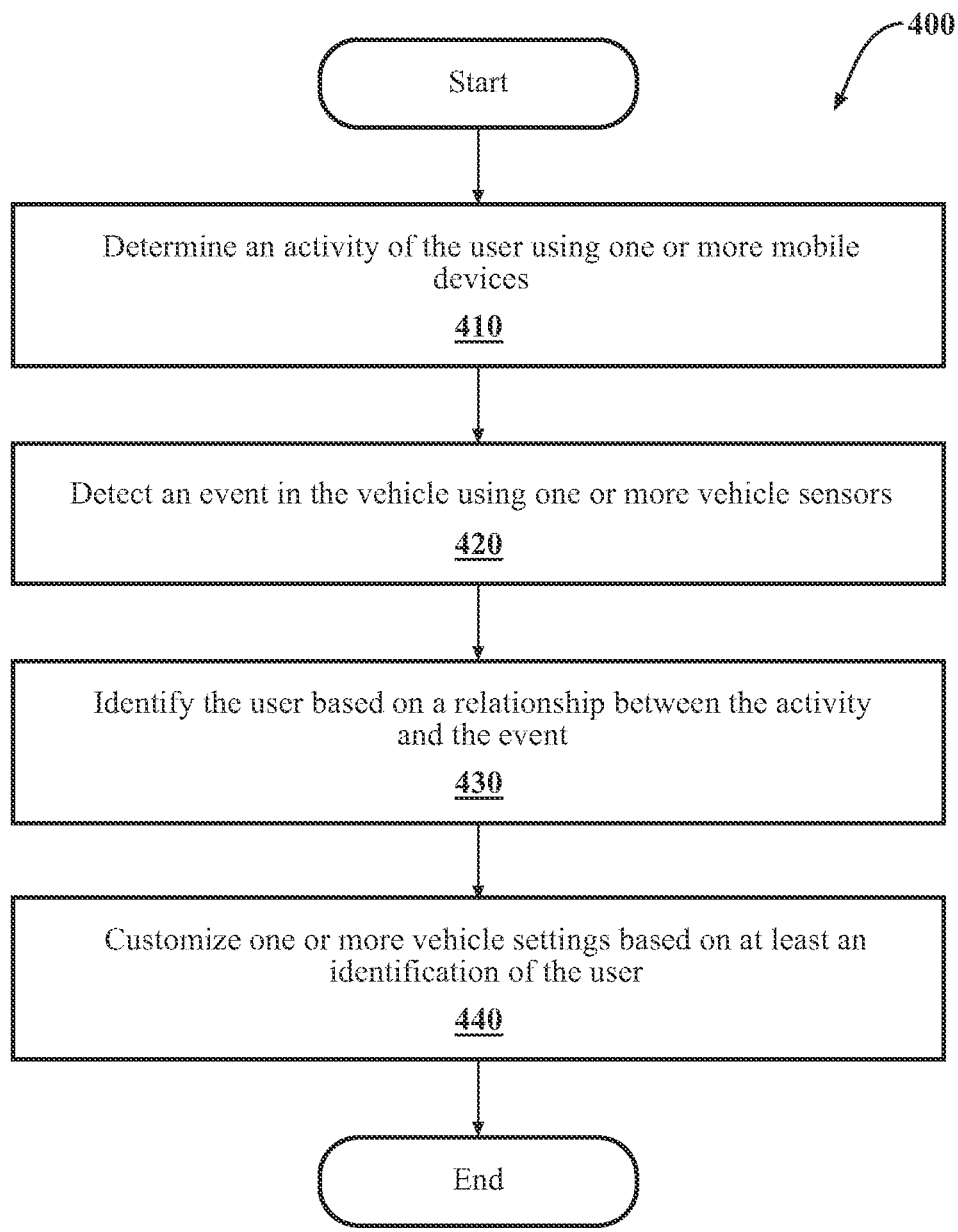
FIG. 4 is a flowchart illustrating one embodiment of a method associated with identifying a user of a vehicle.

FIG. 4 illustrates a method 400 for identifying a user of a vehicle. The method 400 will be described from the viewpoint of the vehicle 102 of FIG. 2 and the vehicle user customization system 270 of FIG. 3. However, the method 400 may be adapted to be executed in any one of several different situations and not necessarily by the vehicle 102 of FIG. 2 and/or the vehicle user customization system 270 of FIG. 3.

At step 410, the vehicle user identification system 100 may determine one or more activities of the user using one or more mobile device(s) 106. As previously mentioned, the mobile device(s) 106 may employ any suitable techniques to determine the activities of the user. The mobile device(s) 106 may transmit the determined activities to other elements in the vehicle user identification system 100 in response to a request or a trigger such as being within a geofence surrounding the vehicle 102. Alternatively and/or additionally, the mobile device(s) 106 may broadcast the determined activities and/or the user identifying information.

At step 420, the vehicle user identification system 100 may detect an event in the vehicle 102 using one or more vehicle sensors 221. As mentioned below, the vehicle sensors 221 may work together or may work independently. The vehicle sensor(s) 221 may store the detected events in the data store 215, 340 and/or in the sensor data 219.

At step 430, the user identification module 320 may cause the processor(s) 210 to identify the user 108 based on the relationship between the activity and the event, as discussed above.

At step 440, the setting customization module 330 may cause the processor(s) 210 to customize one or more vehicle settings based on at least an identification of the user 108, as described above.

Figure 5:
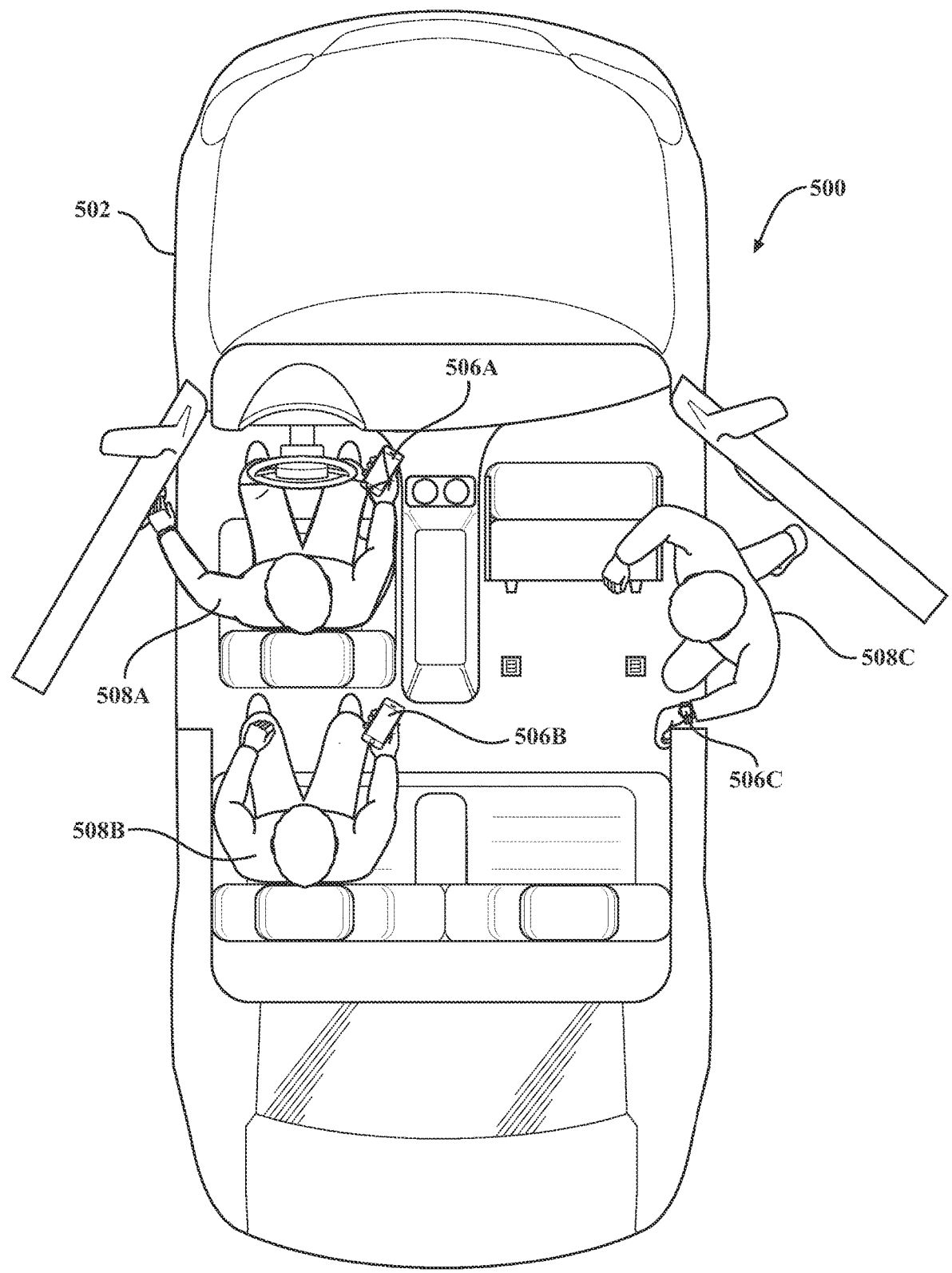
FIG. 5 is an example of a vehicle user customization scenario.

A first non-limiting example of the operation of the vehicle user identification system 100 and/or one or more of the methods will now be described in relation to FIG. 5. FIG. 5 shows an example of a user identification scenario 500. In FIG. 5, the vehicle 502, which is similar to vehicle 102, is parked. Three users 508A, 508B, 508C approach the vehicle 502. The user 508A is carrying a cell phone 506A, the user 508B is carrying a cell phone 506B, and the user 508C is wearing a smart watch 506C.

The vehicle user identification system 100, or more specifically, the cell phone 506A can determine the activities of user 508A to include one or more of walking, stopping, extending left arm, grabbing an object, moving left arm from right to left, sitting, extending left arm, grabbing an object, moving left arm from left to right, extending right leg, depressing right foot, extending right arm while holding an object, and turning right wrist.

The cell phone 506B can determine the activities of user 508B to include one or more of walking, stopping, extending right arm, grabbing an object, moving right arm from left to right, moving right arm in a downward direction, climbing onto a platform, sitting, and sliding from the right to the left.

The smart watch 506C can determine the activities of user 508C to include one or more of walking, stopping, climbing onto a platform, extending right arm, grabbing an object, moving right arm from right to left, sitting, and moving right arm in an upward direction.

The vehicle user identification system 100 can detect events using the vehicle sensor(s) 221. As an example, the door sensor(s) 222 can detect that the left door handle and the right door handles were touched, the left door and the right door were opened and subsequently closed. The seat sensor(s) 223 can detect that a weight was placed on the front left seat. The seat sensor(s) 223 can detect that a weight was placed on the back right seat, the weight was lifted, and the weight was placed on the back left seat. The seat sensor(s) 223 can detect that another weight was placed on the back right seat. The seat sensor(s) 223 can detect that the right front seat was folded forward and then returned to an upright position.

The ignition sensor(s) 224 can detect that a key was inserted into the ignition and the key was turned in the ignition. The camera(s) 226 and the radar(s) 227 can detect a human form in the front left seat and two human forms in the back seats, one in the back left seat and one in the back right seat.

The vehicle user customization system 270, or more specifically, the user identification module 320 may receive the activities detected, the timestamps for the activities, and the user identifying information from the cell phones 506A, 506B and the smart watch 506C. The vehicle user customization system 270, or more specifically, the user identification module 320 may receive the events detected and the timestamps for the events from the vehicle sensors 221.

The user identification module 320 can determine whether the activities and the events occurred within a predetermined time period. For instance, the user identification module 320 can determine that the activity of grasping an object detected by the cell phone 506A occurred at approximately the same time as the event of the left door handle being touched occurred. The user identification module 320 can determine that the activity of the left arm moving from right to left occurred at approximately the same time as the event of the left door opening. The user identification module 320 can determine that the activity of sitting detected by the cell phone 506A occurred at approximately the same time as the event of a weight being placed on the front left seat. The user identification module 320 can determine that, in addition to a relationship based on timestamps, the activity and the event have a relationship based on the information in the activity and event relationship data. The user identification module 320 can then associate the user 508A based on the user identifying information with the front left seat. The user identification module 320 can vary the number of activities and events used to identify the user 508A. The user identification module 320 can use more activities and events in the determination process and further strengthen confidence in the user identification determination.

The user identification module 320 can determine that the activity of grasping an object detected by the cell phone 506B occurred at approximately the same time as the event of the right door handle being touched occurred. The user identification module 320 can determine that the activity of the right arm moving from left to right occurred at approximately the same time as the event of the right door opening. The user identification module 320 can determine that the activity of the right arm moving downwards detected by the cell phone 506B occurred at approximately the same time as the event of the front right seat being folded over. The user identification module 320 can determine that the activity of sitting detected by the cell phone 506B occurred at approximately the same time as the event of a weight being placed on the back right seat. The user identification module 320 can determine that the activity of sliding from right detected by the cell phone 506B occurred at approximately the same time as the event of a weight being lifted from the back right seat and place on the back left seat and/or the event of a human form, detected by the camera(s) 226 and/or the radar(s) 227, moving from right to left. The user identification module 320 can then associate the user 508B based on the user identifying information with the back left seat.

The user identification module 320 can determine that the activity of climbing detected by the smart watch 506C occurred at approximately the same time as the event of a human form being detected in the vehicle cabin. The user identification module 320 can determine that the activity of the right arm moving from right to left occurred at approximately the same time as the event of the right door closing. The user identification module 320 can determine that the activity of the right arm moving upwards detected by the smart watch 506C occurred at approximately the same time as the event of the front right seat being moved into an upright position. The user identification module 320 can determine that the activity of sitting detected by the smart watch 506C occurred at approximately the same time as the event of a weight being placed on the back right seat and/or the event of a human form detected on the back right seat by the camera(s) and/or the radar(s). The user identification module 320 can then associate the user 508C based on the user identifying information with the back right seat. In this example, user 508A is a parent and the users 508B, 508C are their children.

The vehicle user customization system 270, or more specifically, the setting customization module 330 may customize one or more vehicle settings based on at least an identification of the user 508A, 508B, 508C. The setting customization module 330 can receive the user identification from the user identification module 320 and receive the user profiles from the data store 215, 340. The setting customization module 330 can determine the vehicle settings for users 508A, 508B, 508C based on at least, the user identification and the user profiles. As an example, the setting customization module 330 can send out a control signal to the front left seat to move the seat forward and turn on the seat warmer, a second control signal to the entertainment system to turn on the radio, tune the radio to the user's preferred station, and set the volume to the user's preferred setting. The setting customization module 330 can upload a destination and/or route preferences to the navigation settings. As an example and based on the time and/or the users 508A, 508B, 508C, the setting customization module 330 can upload that the destination is a sports park and the route preference excludes highways. The setting customization module 330 can send a control signal to the entertainment system to turn on a back seat video screen and select a television show.

It will be appreciated that arrangements described herein can provide numerous benefits, including one or more of the benefits mentioned herein. For example, arrangements described herein can result in reducing the time spent by the user customizing a vehicle upon entry. The arrangements described herein can result in a reducing error in user input when user input is repeatedly entered upon entry.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5 but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for identifying a plurality of users of a vehicle, the system comprising:
   one or more mobile devices capable of determining an activity of the plurality of users, the plurality of users includes at least one driver and one non-driving passenger;
   one or more vehicle sensors capable of detecting an event;
   one or more processors; and
   a memory in communication with the one or more processors, the memory including:
      a user identification module including instructions that when executed by the one or more processors cause the one or more processors to identify the plurality of users based on a relationship between the activity and the event; and
      a setting customization module including instructions that when executed by the one or more processors cause the one or more processors to customize one or more vehicle settings based on at least an identification of the plurality of users.

2. The system of claim 1, wherein the activity includes one or more of:
   standing, sitting, moving a limb, and changing position.

3. The system of claim 1, wherein the event includes one or more of:
   a movement of a vehicle door, a movement of a vehicle seat, an engine start, an engine stop, an ignition key insertion, an ignition key removal, and motion in the vehicle.

4. The system of claim 1, wherein the relationship is based on a timestamp of the activity and a timestamp of the event.

5. The system of claim 1, wherein the one or more mobile devices include information identifying at least one of the plurality of users.

6. The system of claim 1, wherein the
   setting customization module further includes instructions that when executed by the one or more processors cause the one or more processors to customize the one or more vehicle settings based on at least a condition, wherein the condition is one of time of day or a number of the plurality of users.

7. The system of claim 6, wherein the one or more vehicle settings includes:
   entertainment settings, seat settings, and navigation settings.

8. A method for identifying a plurality of users of a vehicle, the method comprising:
   determining an activity of the plurality of users using one or more mobile devices, the plurality of users includes at least one driver and one non-driving passenger;
   detecting an event in the vehicle using one or more vehicle sensors;

identifying the plurality of users based on a relationship between the activity and the event; and customizing one or more vehicle settings based on at least an identification of the plurality of users.

9. The method of claim 8, wherein the activity includes one or more of:

standing, sitting, moving a limb, and changing position.

10. The method of claim 8, wherein the event includes one or more of:

a movement of a vehicle door, a movement of a vehicle seat, an engine start, an engine stop, an ignition key insertion, an ignition key removal, and motion in the vehicle.

11. The method of claim 8, wherein the relationship is based on a timestamp of the activity and a timestamp of the event.

12. The method of claim 8, wherein the one or more mobile devices include information identifying at least one of the plurality of users.

13. The method of claim 8, further comprising:

customizing the one or more vehicle settings based on at least a condition, wherein the condition is one of time of day or a number of the plurality of users.

14. The method of claim 13, wherein the one or more vehicle settings includes:

entertainment settings, seat settings, and navigation settings.

15. A non-transitory computer-readable medium for identifying a plurality of users of a vehicle and including instructions that when executed by one or more processors cause the one or more processors to:

determine an activity of the plurality of users using one or more mobile devices, the plurality of users includes at least one driver and one non-driving passenger;

detect an event in the vehicle using one or more vehicle sensors;

identify the plurality of users based on a relationship between the activity and the event; and customize one or more vehicle settings based on at least an identification of the plurality of users.

16. The non-transitory computer-readable medium of claim 15, wherein the activity includes one or more of: standing, sitting, moving a limb, and changing position.

17. The non-transitory computer-readable medium of claim 15, wherein the event includes one or more of: a movement of a vehicle door, a movement of a vehicle seat, an engine start, an engine stop, an ignition key insertion, an ignition key removal, and motion in the vehicle.

18. The non-transitory computer-readable medium of claim 15, wherein the relationship is based on a timestamp of the activity and a timestamp of the event.

19. The non-transitory computer-readable medium of claim 15, wherein the instructions further include instructions that when executed by the one or more processors cause the one or more processors to customize one or more vehicle settings based on at least a condition, wherein the condition is one of time of day or a number of the plurality of users.

20. The non-transitory computer-readable medium of claim 19, wherein the one or more vehicle settings includes: entertainment settings, seat settings, and navigation settings.

* * * * *